(12) United States Patent
Leathers

(10) Patent No.: US 6,419,078 B1
(45) Date of Patent: Jul. 16, 2002

(54) LUBRICATING DEVICE FOR CONVEYOR SYSTEMS

(75) Inventor: Michael E. Leathers, Lowell, MI (US)

(73) Assignee: Frost Links, Inc., Grand Rapids, MI (US)

( * ) Notice: Subject to any disclaimer, the term of this patent is extended or adjusted under 35 U.S.C. 154(b) by 0 days.

(21) Appl. No.: 09/806,750

(22) PCT Filed: Oct. 1, 1999

(86) PCT No.: PCT/US99/22782

§ 371 (c)(1),
(2), (4) Date: Apr. 3, 2001

(87) PCT Pub. No.: WO00/20307

PCT Pub. Date: Apr. 13, 2000

Related U.S. Application Data

(60) Provisional application No. 60/103,212, filed on Oct. 6, 1998.

(51) Int. Cl.[7] .............................................. B65G 45/02
(52) U.S. Cl. ....................................... 198/500; 184/15.2
(58) Field of Search .......................... 198/500; 184/15.1, 184/15.2; 474/91

(56) References Cited

U.S. PATENT DOCUMENTS

| 579,385 | A |   | 3/1897  | Dodge       |          |
|---------|---|---|---------|-------------|----------|
| 1,788,364 | A |   | 1/1931 | Gies        |          |
| 2,293,578 | A |   | 8/1942 | Tuhy        | 184/15   |
| 2,593,841 | A |   | 4/1952 | Burchsted   | 184/15   |
| 2,664,969 | A | * | 1/1954 | Bjerre      | 184/15   |
| 2,920,720 | A |   | 1/1960 | Hemsley     | 184/15   |
| 2,998,865 | A |   | 9/1961 | Geissler    | 184/15   |
| 3,067,837 | A | * | 12/1962 | Burrows    | 184/15   |
| 3,762,504 | A |   | 10/1973 | Banyas et al. | 184/15 A |
| 3,896,901 | A |   | 7/1975 | Ango        | 184/15 R |
| 4,009,764 | A |   | 3/1977 | Hafner      | 184/15 A |
| 4,064,970 | A |   | 12/1977 | Reeves     | 184/15 B |
| 4,085,821 | A |   | 4/1978 | Kast et al. | 184/15 A |
| 4,173,279 | A |   | 11/1979 | Lichti et al. | 198/500 |
| 4,212,372 | A |   | 7/1980 | Murphy et al. | 184/15 B |
| 4,506,763 | A |   | 3/1985 | Frost et al. | 184/15.2 |
| 4,537,285 | A |   | 8/1985 | Brown et al. | 184/15.2 |
| 4,630,712 | A |   | 12/1986 | Hoseley    | 184/15.3 |
| 4,648,486 | A | * | 3/1987 | Kayser et al. | 184/15.1 |
| 4,877,111 | A |   | 10/1989 | Kilper     | 184/15.1 |
| 5,129,481 | A |   | 7/1992 | King        | 184/15.3 |
| 5,669,839 | A |   | 9/1997 | Graf et al. | 474/91   |
| 5,711,050 | A |   | 1/1998 | Pimentel   | 15/302   |
| 5,934,411 | A | * | 8/1999 | Murano et al. | 184/11.5 |

FOREIGN PATENT DOCUMENTS

CH 284244 1/1952
JP 0004370 6/1972

* cited by examiner

*Primary Examiner*—Christopher P. Ellis
*Assistant Examiner*—Joe Dillon, Jr.
(74) *Attorney, Agent, or Firm*—Van Dkye, Gardner, Linn & Burkhart, LLP

(57) ABSTRACT

A conveyor lubricating device for providing lubrication to a drive chain of a trolley which travels along a track of a conveyor system. The lubricating device is positionable adjacent an arcuate section of track between horizontal section at different height. The lubricating device provides lubricant to the chain as they are in their most opened orientation as the chain bends along the curve. The lubricating device is for lubricating chains in a system having an enclosed I-beam track.

25 Claims, 7 Drawing Sheets

LUBRICATING DEVICE FOR CONVEYOR SYSTEMS

This PCT application claims priority from United States provisional application, ser. no. 60/103,212, filed Oct. 6, 1998, which is hereby incorporated herein by reference.

BACKGROUND OF THE INVENTION

This invention relates generally to lubricating devices for material handling systems and, more particularly, lubricating devices for monorail and trolley material handling systems.

A monorail material handling system generally consists of an elongated I-beam, or enclosed track, along which a trolley is guided and supported. The trolley includes rollers which travel along the I-beam, and further includes a portion extending generally downwardly from the rollers on which the subject material is supported. The material handling system may include several trolleys that travel along the monorail I-beam, which are driven or pulled by a chain or other flexible linkage. Such monorail trolley systems can be found in many applications, an example being a trolley and monorail system for moving items through the various processing steps.

In order to keep the trolley rollers and chain operating smoothly, at least one lubricating device is mounted along the I-beam, typically on the upper surface of the I-beam along a horizontal section thereof The lubricating device includes a reservoir for holding the oil or other lubricating fluid, and internal electronic and hydraulic components for directing an appropriate amount of lubricant onto the trolley rollers and chain as they pass beneath the lubricating device.

Generally, the location selected at which the conveyer lubricator will be installed is determined by the design of the system and the ease of access to the lubricator. Heretofore, the location has always been selected to be along the top of the I-beam on a horizontal section of the beam. Several nozzles then protrude substantially directly downward from the conveyor lubricator to provide lubricant to the rollers of the trolleys and the drive chain as they pass therebeneath. The lubricant is then directed toward the joints of the chain while the chain is in a straight, horizontal orientation, such that the lubricant is provided when the chain linkages are not moving relative to one another.

While a typical lubrication system, as discussed above, may provide lubricant to the chains, the system may fail to lubricate the joints of the chain such that the lubricant penetrates fully therein. This is especially troublesome in rivetless and bolted chains, such as the commercially available Frost Smooth link and Frost Sani-link chains, manufactured and marketed by Frost Links, Inc. in Michigan, wherein the bolt rotates 360° within the joint of the chain, thus requiring additional lubricant around the circumference of the bolt in order to maintain optimal performance and extended chain life. An additional concern with the conventional lubrication systems, is that the system may be positioned along the I-beam or enclosed track such that it is difficult to periodically check and fill the fluid levels in the reservoir. Furthermore, in order to check and fill the levels, which is performed on a generally regular basis, the conveyor system must be shut down to facilitate safe access of the reservoir by a technician.

SUMMARY OF THE INVENTION

The present invention is intended to provide a lubrication device which provides lubricant to the chain of a material handling system in a manner which results in full lubrication of the bolts or pins of the chain. While materials are transported along a track or beam of a typical material handling system, the track may have several horizontal sections at different heights therealong. Between two consecutive horizontal sections, the track also has an arcuate vertical transition section which is generally S-shaped so as to provide a smooth curvilinear transition from one height to the next. The lubrication device of the present invention provides lubricant to the chain as it curves or bends through the transitional section in order to lubricate the joints of the chain when they are in their most open position and to lubricate the bolts of the chain as they rotate within each joint.

According to an aspect of the present invention, a chain lubricating device for lubricating chain in a conveyor system comprises a reservoir, a metering device and at least one applicating device for applying lubricant to the chain. The conveyor system has a conveyor track and a plurality of trolleys movable along the track. The trolleys are interconnected by a drive chain. The conveyor track or enclosed track has multiple horizontal sections, at least two of which are at dissimilar heights and interconnected by arcuate transition sections to accommodate movement of the trolleys and chain from one height to the other. The reservoir contains lubricating fluid. The metering device meters the flow of lubricating fluid and is mountable to the conveyor track adjacent to an arcuate section. The applicating device is interconnected to the metering device. The applicating device is located alongside the adjacent arcuate section whereby the drive chain is lubricated while transitioning through the arcuate section.

In one form, the reservoir is positioned remotely from the metering device. The lubricating device includes a pump which is operable to communicate lubricating fluid from the reservoir to the metering device.

These and other objects, advantages, purposes and features of this invention will become apparent upon review of the following specification in conjunction with the drawings.

DESCRIPTION OF THE PREFERRED EMBODIMENTS

Figure 1:
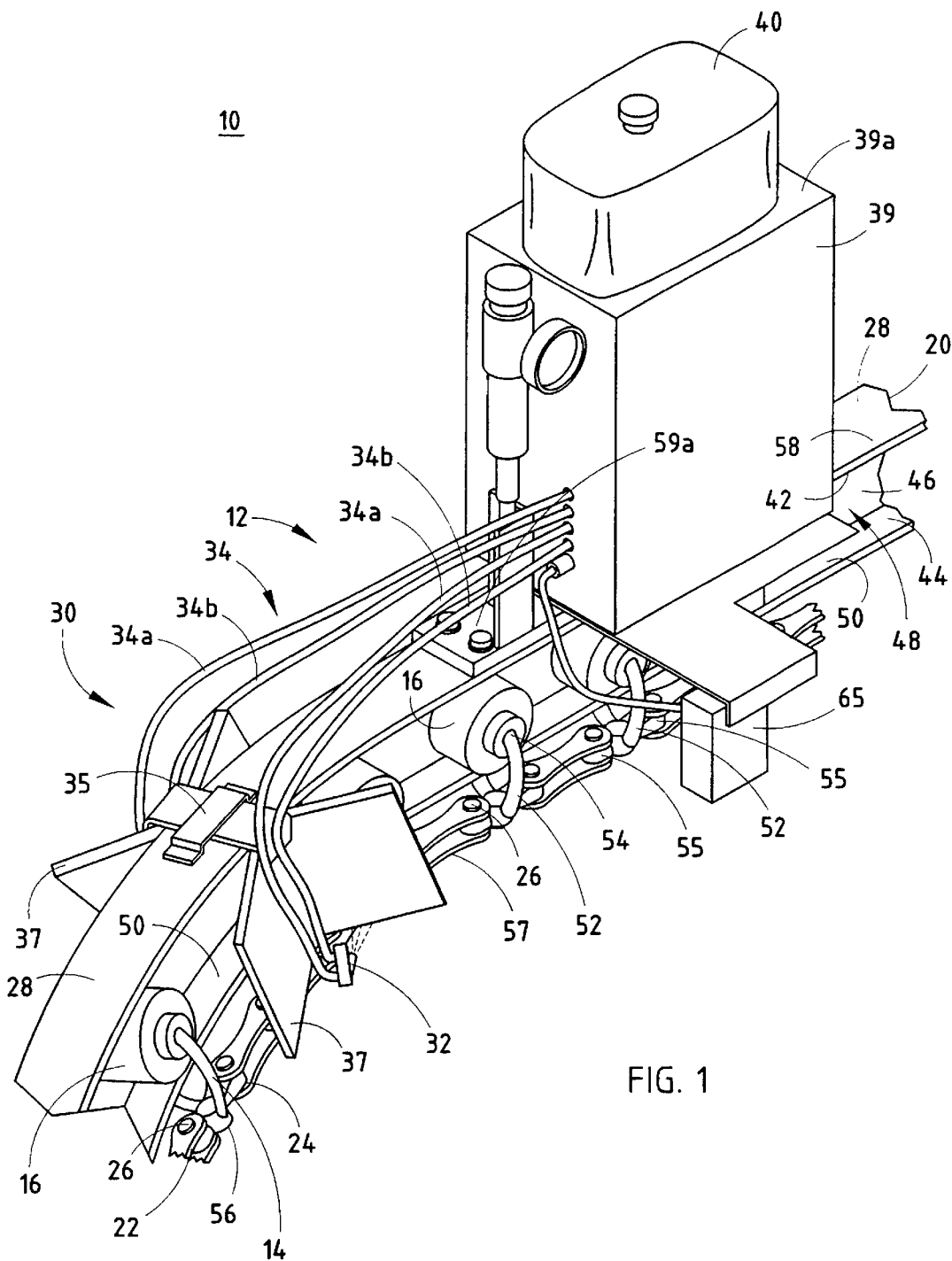
FIG. 1 is a perspective view of a conveyor lubricator on an I-beam track.
Figure 2:
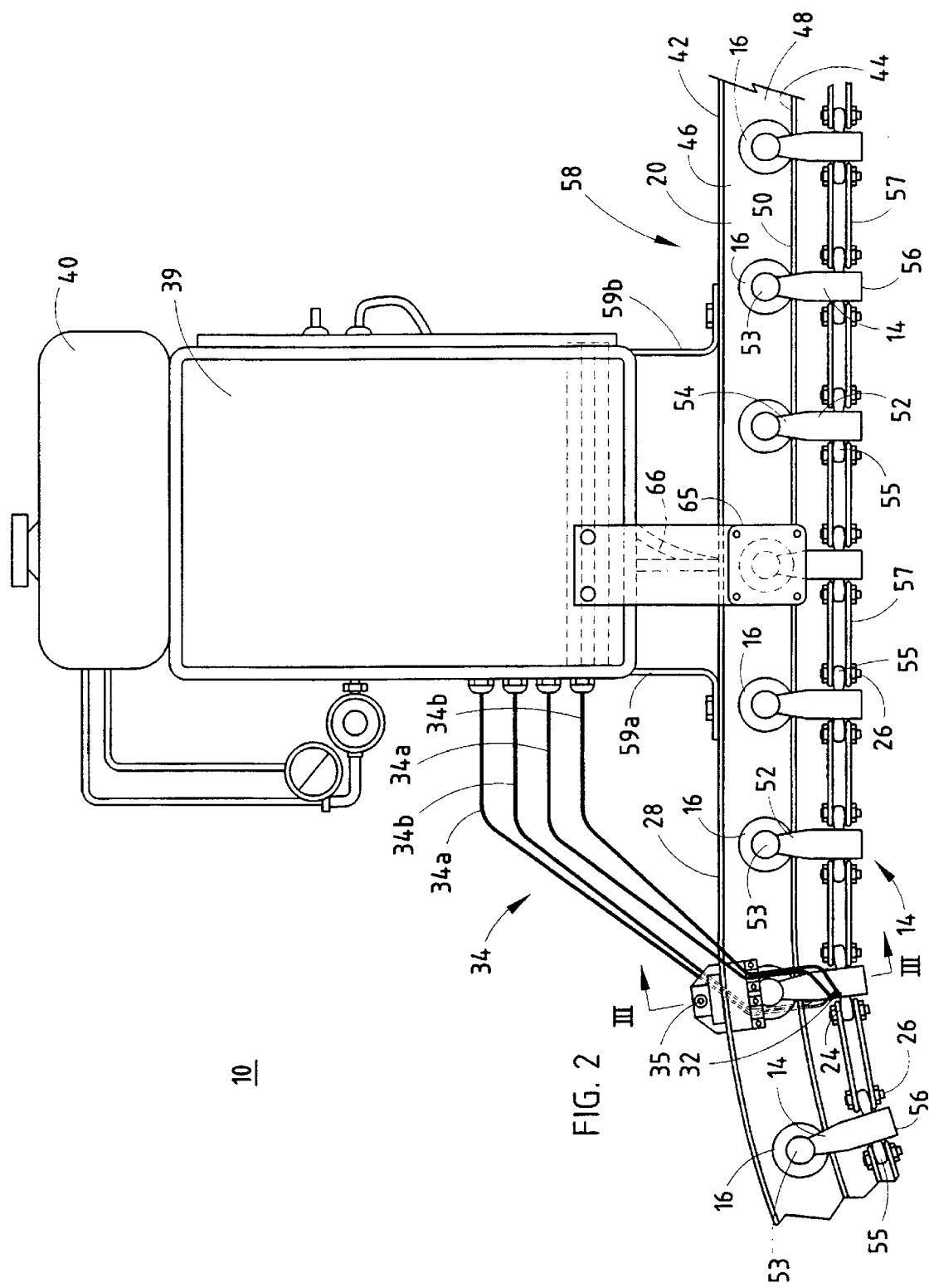
FIG. 2 is a side elevation of a material handling system having the conveyor lubricator attached thereon.
Figure 3:
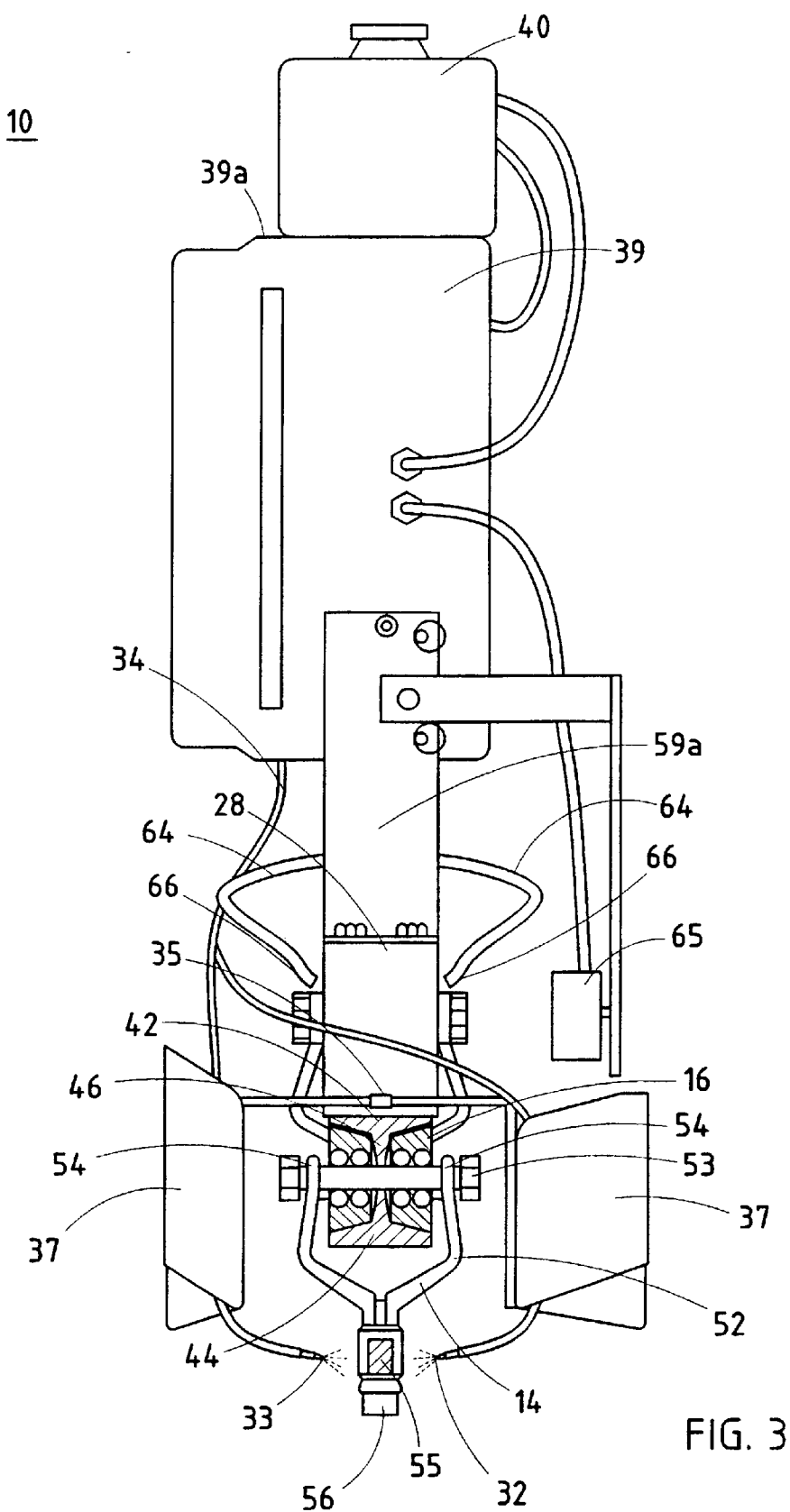
FIG. 3 is a sectional view taken along the line III—III in FIG. 2.

Referring now specifically to the drawings, and the illustrative embodiments depicted therein, there is shown in FIGS. 1, 2 and 3 a lubricating device 10 for a conveyor system 12. Conveyor system 12 includes multiple conveyors or trolleys 14 with rollers 16 for carrying subject material along conveyor system 12. Each trolley 14 is driven along a beam or track 20 by a flexible linkage or drive chain 22. Track 20 may be a conventional I-beam track, an enclosed track or any other known conveyor track, without affecting the scope of the invention. Preferably, lubricating device 10 is secured on an upper surface 28 of track 20 of conveyor system 12 adjacent to an arcuate section 30 of track 20. However, lubricating device 10 may alternately be mounted along arcuate section 30, as discussed below, without affecting the scope of the present invention. Lubricating device 10 may be mounted directly to a portion of the track, as discussed below, or may be mounted to a separate platform or the like which is positionable generally along or adjacent to the track, without affecting the scope of the present invention. A plurality of lubricating nozzles 32 and 33 (FIGS. 1, 2 and 3) and hoses 34 extend from lubricating device 10 to directly apply lubricating fluid to chain 22 of conveyor system 12 as it travels along arcuate section 30. Application of lubricating fluid on chain 22 in such a location provides for easier access to the joints 24 of chain 22, resulting in more definitive lubrication of joints 24 of chain 22.

As best shown in FIGS. 1 and 3, track 20 may be a conventional I-shaped beam, having upper and lower horizontal flanges 42 and 44 which are interconnected by a vertical flange 46. Horizontal flanges 42 and 44 and vertical flange 46 form two generally C-shaped roller recesses 48, one along each side of track 20, such that each roller 16 contacts a lower surface 50 of one of the recesses 48. Track 20 typically has a number of horizontal sections 58 at different heights for conveying material to different levels as required either due to plant constraints or locations of processing stations. Between consecutive horizontal sections, track 20 includes arcuate section 30, which is generally S-shaped to provide a smooth curvilinear transition between the adjacent horizontal sections. The S-shaped section thus comprises an upper transitional section adjacent to an upper horizontal section (as shown in FIGS. 1, 2, 3, and 5), and a lower transitional section adjacent to a lower horizontal section (not shown).

Extending downwardly from each pair of rollers 16 is a trolley 14. Because the precise design of trolley 14 is not critical to the present invention, trolley 14 is represented in the drawings as simply a Y-shaped bracket 52, with each end 54 having a roller 16 rotatably mounted thereto by an axle or pin 53. Trolley 14 further includes a conventional mounting apparatus 56 extending downwardly therefrom that may be threaded for receiving a correspondingly threaded carrying apparatus, or may be hook-shaped or the like for attaching a carrying apparatus thereto, for carrying material along conveyor system 12. The conveying apparatus 56 may hook or otherwise engage a carrying apparatus (not shown) or the material to be conveyed and support the material as it is moved along track 20 by trolleys 14. The material being conveyed may be food, packages, equipment or various devices or components thereof, or components for a vehicle or other assembly, which are conveyed to an appropriate station along an assembly line for installation onto the vehicle or other assembly. Trolley 14 may comprise two or more pairs of rollers interconnected with one another at a lower end of brackets 52 by a load bar (not shown) to increase the load capacity of trolley 14.

Figure 4:
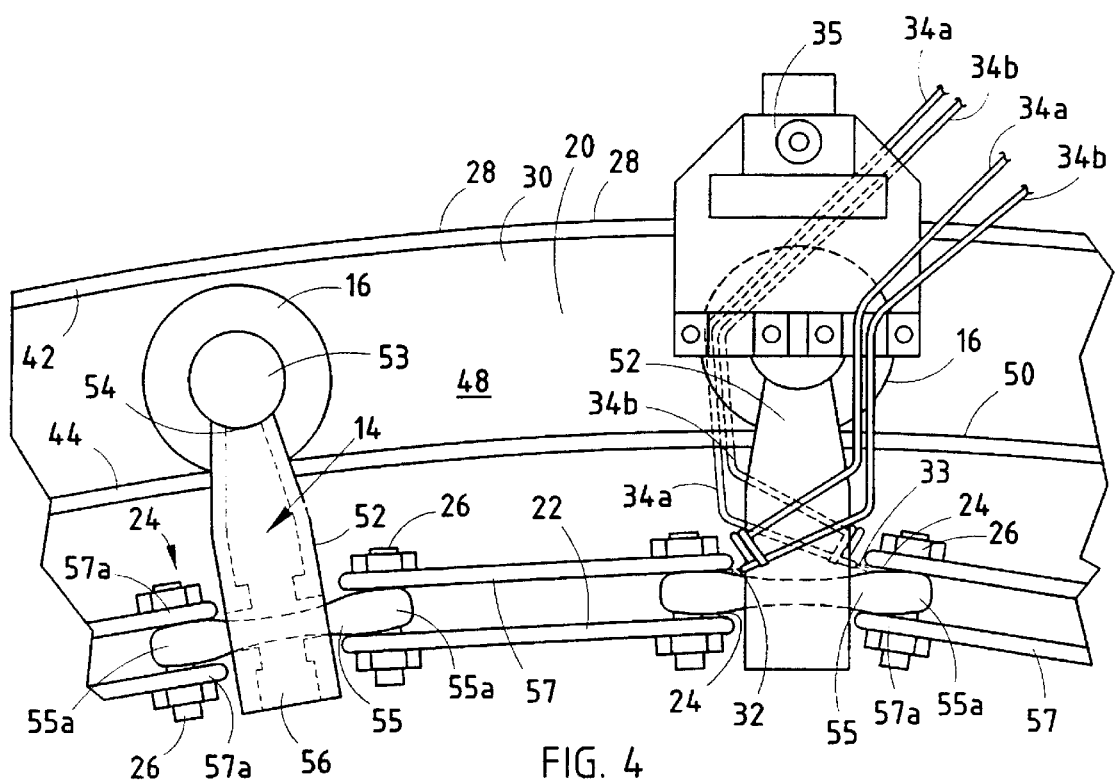
FIG. 4 is an enlarged view of the conveyor and nozzles as the joints of the chain bend and open through an arcuate section of the system.

Trolleys 14 are interconnected to one another by a continuous or endless chain 22, which is driven by a drive motor (not shown) to move the trolleys along the conveyor track and in a continuous loop. Chain 22 consists of a plurality of connecting members or links 55 and 57 interconnected together at joints 24. As shown in FIG. 4, each link or connecting member 55 is pivotally secured at each end 55a between the ends 57a of corresponding pairs of connecting members 57 by a pin or bolt 26, thereby forming joint 24. As the chain linkages travel generally parallel to and along track 20, the links 55 and 57 pivot relative to one another as chain 22 moves through arcuate transitional section 30 of track 20. This pivoting motion opens the joints 24 of chain 22 and further results in rotation of bolt 26 within links 55 and 57. Because bolt 26 rotates within the linkages during various vertical or lateral bending motions encountered along track 20, excessive wear and damage of bolt 26 and/or links 55 and 57 may result if the appropriate amount of lubricant is not applied to the links in a timely and effective manner.

Preferably, lubricating device 10 is a conventional conveyor lubricator, and includes a housing 39 and a reservoir 40 which may be positioned on an upper surface 39a of housing 39. Housing 39 substantially encases means for metering the flow of an appropriate amount of lubricating fluid downwardly from reservoir 40, through housing 39 and into hoses 34 interconnected to lubricating device 10 for dispensing of the fluid to chain 22 via nozzles 32 and 33. The metering means preferably are conventional electronic and hydraulic internal components located within housing 39, and are well known in the art. Lubricating fluid may also be metered and dispensed to the rollers 16 of trolleys 14 via a pair of hoses 64 and nozzles 66 (FIG. 3).

Lubricating device 10 further includes a base or mounting brackets 59a and 59b which are secured to track 20, and are preferably positioned along an upper horizontal section 58 and on upper surface 28 of track 20 such that lubricating device 10 is adjacent to arcuate section 30 as it begins its downward curvature. Lubricating device 10 preferably further includes a proximity sensor 65 which extends downwardly alongside track 20 to detect the presence of the trolleys 14 as they travel along track 20. Proximity sensor 65 provides a signal to a control (not shown), which then may cause the metering means and nozzles 32, 33 and 66 to dispense an appropriate amount of fluid at the proper time to optimally lubricate the chain 22 and trolleys 14 as they travel past lubricator 10. Preferably, lubricating device 10 further includes a pressurized air supply (not shown), which allows pressurized air to be mixed with the lubricant by the metering means to facilitate a substantially uniform spray of lubricant from the nozzles onto the chains and rollers.

Chain lubricating nozzles 32 and 33 are connected to lubricating device 10 by hoses 34 and preferably are oriented to direct lubricating fluid onto joints 24 of chain 22 from an upper side as they curve downwardly along arcuate section 30. Preferably, hoses 34 are coaxial hoses which include a lubricant hose 34a and an air hose 34b. The hoses 34a and 34b are interconnected at nozzles 32 and 33 to mix the air and lubricant under pressure, such that the lubricant is dispensed as a spray. This further facilitates optimal lubrication of the joints 24 of chains 22, since a mist or spray of lubricant may better penetrate the open joints of the chains as they pass by the nozzles 32 and 33. Nozzles 32 and 33 and hoses 34 may be secured alongside beam 20 by a bracket 35, which is secured to upper surface 28 of beam 20 and extends downwardly along both sides of the beam to secure and direct the hoses and nozzles toward the joints 24 of the chains 22 as they bend and open along the arcuate section. A protective shield 37 may be positioned along each side to protect the hoses 34 from being contacted or damaged by the trolleys as they move along the beam past the hoses 34 and nozzles 32 and 33.

As chain 22 curves downwardly, bolts 26 rotate within joints 24, which are at their most opened position along the curve. Because lubricant is preferably provided to joints 24 at this location, lubricating device 10 provides substantially 360 degree lubrication of bolt 26 and full penetration of lubricating fluid into joints 24, as best shown in FIG. 4. Although other types of pins for chain linkages, such as I-pins and the like, do not rotate within the chain links, clearly the present invention facilitates greater lubrication of other chain linkages by lubricating joints 24 as they are in their most open orientation. Lubricating device 10 may also provide lubricant to rollers 16 of each trolley 14 via hoses 64 and nozzles 66, which are preferably directed beneath lubricating device 10 to provide lubricating fluid to rollers 16 of trolleys 14 as the trolleys travel beneath lubricating device 10. A middle nozzle (not shown) may also be included to direct fluid to both rollers from within track 20, as is known in the art. Therefore, by positioning lubricating device 10 adjacent to arcuate section 30, access to joints 24 of chain 22 is optimized without adversely affecting access to the other moving parts of conveyor system 12.

Although shown and described as being positioned on an upper horizontal section 58 of track 20, clearly a lubricating device may be positioned on a lower horizontal section, thereby being adjacent arcuate section 30 as it begins its upward curve, without affecting the scope of the present invention. While not specifically shown in the drawings, this embodiment is installed and operated in a similar manner as lubricating device 10 on upper horizontal section 58, discussed above. However, in order to provide lubricating fluid to joints 24 at their open orientation, chain lubricating nozzles and hoses preferably extend downwardly from the lubricating device to provide lubricating fluid to chain 22 from an underside of chain 22.

Figure 5:
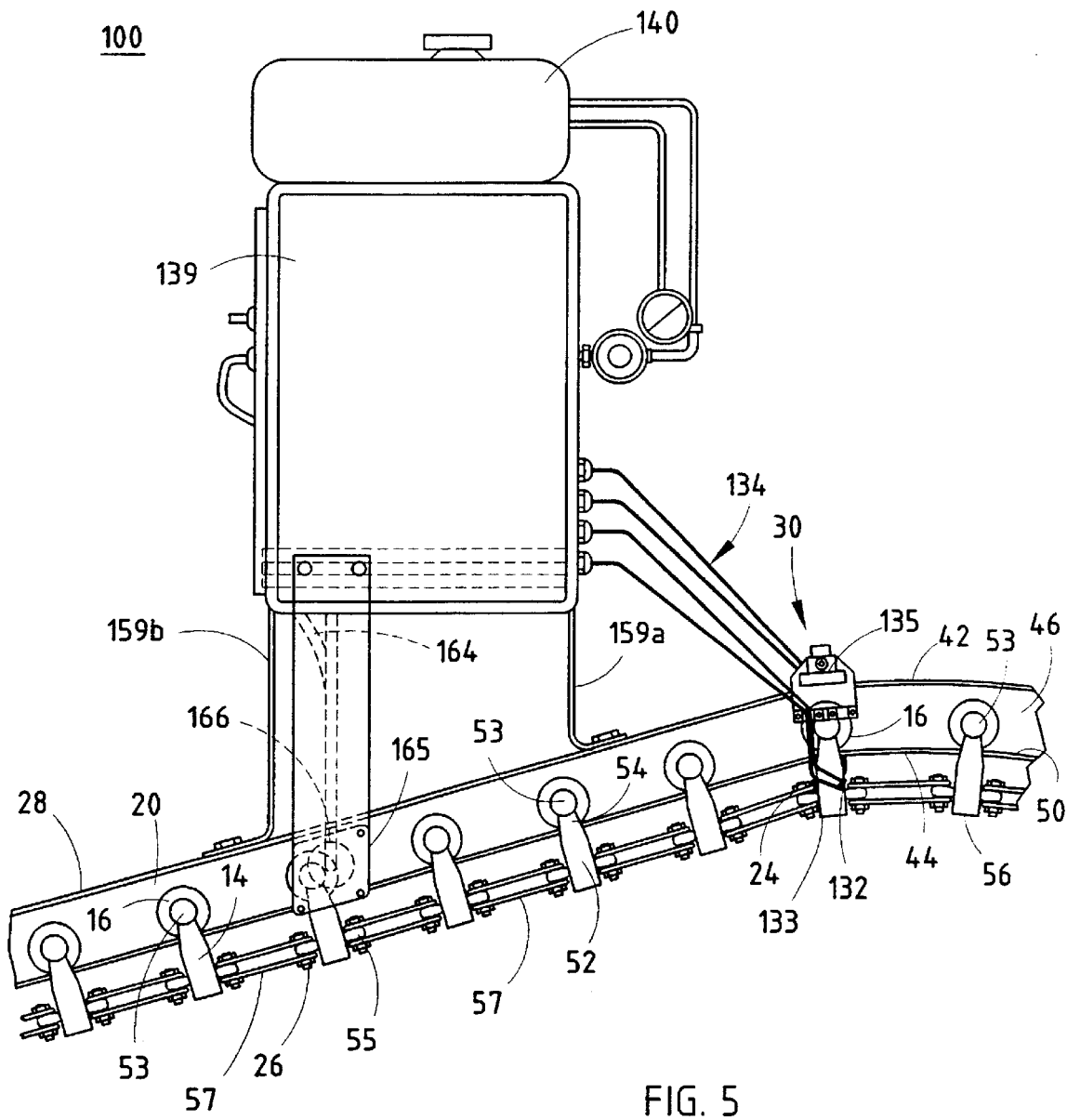
FIG. 5 is a side elevation of an alternate embodiment of the invention, with the conveyor lubricator being mounted along an arcuate section of track.

Referring now to FIG. 5, a lubricating device 100 may be mounted on upper surface 28 of track 20 along a downward bend or curvature. Lubricating device 100 may be substantially similar to lubricating device 10, discussed above, and may include a reservoir 140 mounted on top of a housing 139, which encases the fluid dispensing means (not shown) via nozzles 132 and 133. A modified base may be fixedly mounted to track 20 and preferably includes upper and lower mounting extensions 159a and 159b for supporting lubricating device 100 in an upright, substantially horizontal or level orientation. Lower mounting extension 159b is mounted on track 20 at a lower or downward location from upper mounting extension 159a. Preferably, lower mounting extension 159b is a greater length than upper mounting extension 159a, such that lubricating device 100 is mountable to track 20 in a generally level orientation. Installing lubricating device 100 in this manner allows chain lubricating nozzles 132 and 133 to be connected to lubricating device 100 by shorter hoses 134, yet still provide lubricant to the chain joints 24 at their most open orientation along arcuate section 30. Similar to lubricator 10 discussed above, lubricating device 100 may include a proximity sensor 165 and a hose 164 and nozzle 166 for lubricating the rollers 16 of trolleys 14, as they travel along beam 20 beneath lubricating device 100, as is known in the art.

Figure 6:
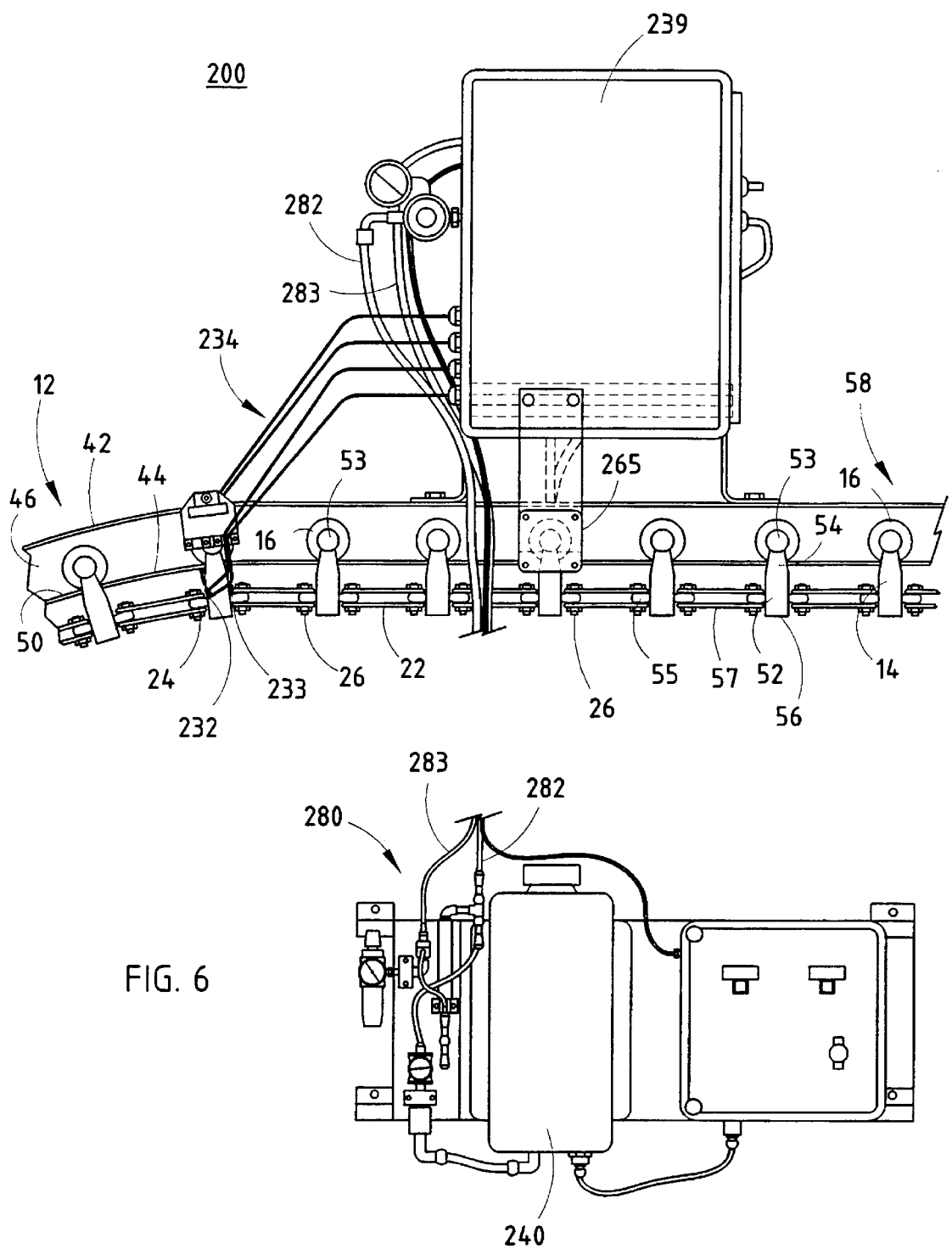
FIG. 6 is a side elevation of an alternate embodiment, with a separate lubricant reservoir and pump positioned remotely from the conveyor lubricator.

In an alternate embodiment, as shown in FIG. 6, a lubricating device 200 may include a separate reservoir 240 and a pump 280, which may be positioned remotely from lubricating device 200. Lubricating device 200 is preferably generally similar to lubricating device 10, discussed above, and is implemented along a similar conveyor system 12. Lubricating device 200 includes nozzles 232 and 233 for dispensing lubricant to the joints 24 of chains 22 via hoses 234 and may further include a nozzle (not shown) for dispensing lubricant to the rollers 16. A proximity sensor 265 may also be included to provide a signal when the conveyor trolleys 14 are at a position for receiving lubricant. Reservoir 240 and pump 280 may be located on the floor of the plant or factory, or otherwise located at a convenient location for checking and filling the lubricating fluid. Reservoir 240 is interconnected to a fluid entry opening in lubricating device 200 by a conduit or tube 282. A second conduit 283 may provide compressed air to lubrication device 200. Pump 280 is preferably a pneumatic powered pump and may be included at reservoir 240 in line with a conduit 282 to communicate the lubricating fluid to lubricating device 200. However, pump 280 may otherwise be positioned within reservoir 240 or housing 239 of lubricating device 200 or in any other location along conduit 282 between reservoir 240 and housing 239, without affecting the scope of the present invention. By locating reservoir 240 remote from lubricating device 200 and maybe even from conveyor system 12, the selected location of lubricating device 200 does not have to be as easily accessible for quick fluid checks and refills, since the fluid level may be easily checked where the reservoir 240 is located. Therefore, lubricating device 200 may be positioned so as to optimize the lubrication of conveyor system 12. Furthermore, because reservoir 240 is remote from lubricating device 200, conveyor system 12 no longer has to be shut down for every inspection and possible refill of the lubricating fluid within reservoir 240. These processes can be carried out conveniently and easily with reservoir 240 located in a safer and more readily accessible location.

Figure 7:
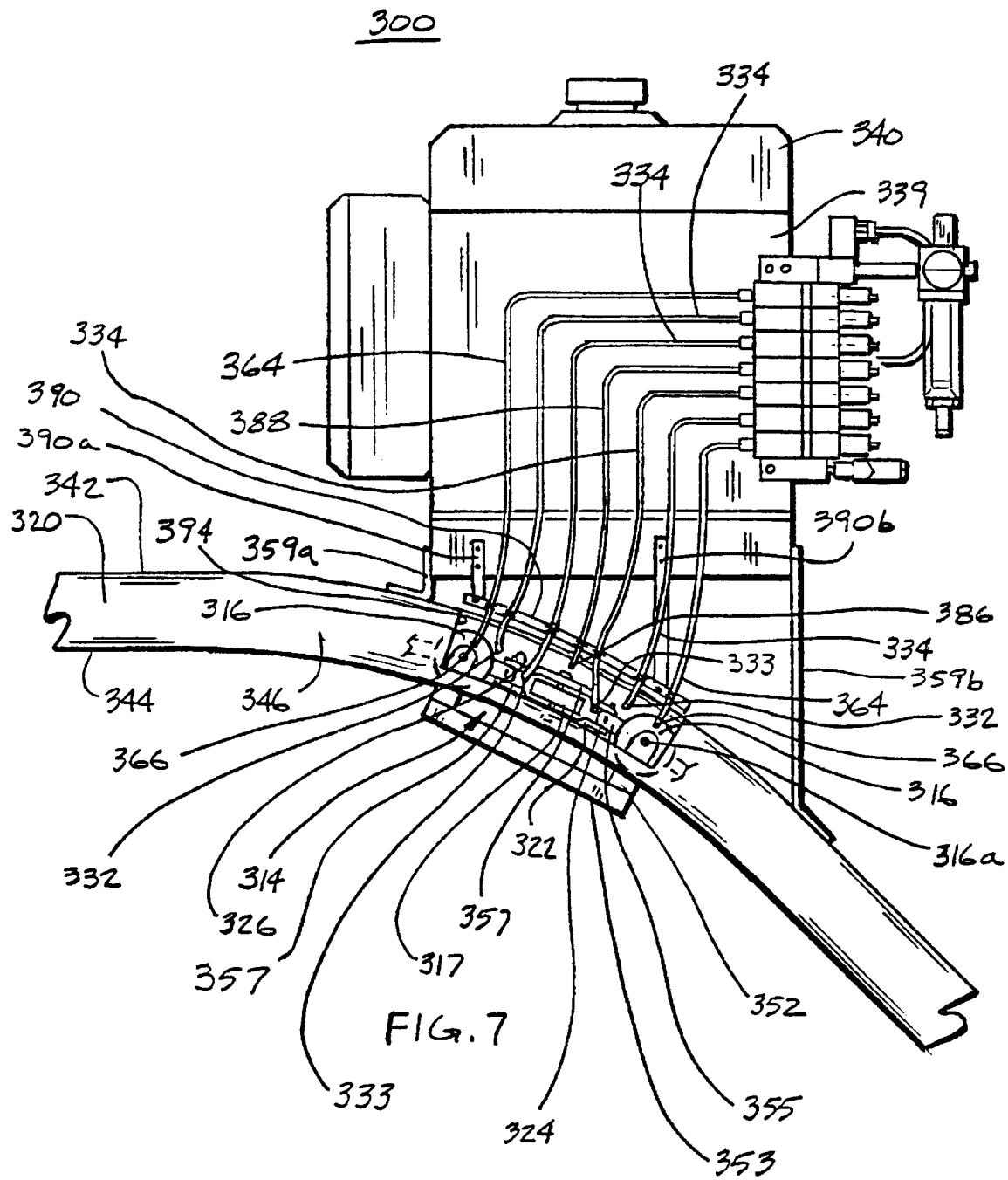
FIG. 7 is a side elevation of an alternate embodiment of the conveyor lubricator on an enclosed track.

Referring now to FIG. 7, a lubricating device 300 is positionable along an enclosed track 320. Enclosed tracks are known in the art of conveying systems and comprise an upper wall 342, two opposite sidewalls 346, and a partial lower wall 344, which define a generally C-shaped channel which is opened or slotted along its lower wall 344. A plurality of trolleys 314 travel along and within enclosed track 320 and are interconnected by a continuous or endless drive chain 322. The trolleys 314 comprise a pair of vertical wheels or rollers 316, and a horizontal or lateral wheel or roller 317, which are rotatably mounted to the links of chain 322. As is known in the art, a pair of vertical rollers 316 are mounted to opposite sides of a chain link 355. Each end of chain link 355 is pivotally interconnected with a pair of chain links 357 via a pin, bolt, or other known chain connecting members 326. Lateral roller 317 is rotatably mounted between each of the links 357 of the pair of chain links 357. The trolley 14 may suspend from one or more of the vertical rollers 316 via an attaching apparatus 352 rotatably mounted to an axle 316a of vertical roller 316. As shown in FIG. 7, two or more of the vertical rollers and corresponding attaching portions 352 may be connected by a load bar 353 to increase the load capacity of the trolleys 14.

Rollers 316 and 317 and chain 322 travel within the C-shaped channel of enclosed track 320. Each of the vertical rollers rolls along each side of the partial lower wall 344 and may engage an inner surface of upper wall 342 along a transitional arcuate section of track as the trolleys 14 transitioned between an upper vertical section to a lower horizontal section via a lower vertical section. Lateral roller guides the chain and trolley through the enclosed track, rolling along either of the sidewalls 346 as the trolleys 14 move along the enclosed track 320.

Conveyor lubricator 300 is preferably mounted to upper wall 342 along an arcuate section of track as the track 320 transitions between horizontal sections of differing heights.

Similar to conveyor lubricator 100, discussed above, lubricator 300 preferably comprises conventional dispensing means (not shown) substantially encased through the housing 339 and a lubricant reservoir 240. Lubricant reservoir 240 may be mounted to housing 339, or may be remotely positioned therefrom, similar to reservoir 340 of lubricating device 200, discussed above. Preferably, lubricator 300 is mounted along upper wall 342 of enclosed track 320 and immediately above the arcuate section of track via an upper mounting member 359a and a lower mounting member 359b. Enclosed track 320 is preferably cut open at the desired lubrication location, such that an opening 394 is formed along track 320 for access to the chains and rollers within the track as they travel therealong. However, lubricator 300 may otherwise be mounted along the horizontal section of track, similar to conveyor lubricator 10, discussed above, or may even be mounted along one of the side walls 346 at either the arcuate section of track or along one of the horizontal sections generally adjacent to an arcuate section of track, without affecting the scope of the present invention.

Lubricator 300 provides lubricating fluid to the rollers 316 and 317 and the joints 324 of chain 322 via a plurality of lubricating dispensing nozzles and hoses. For example, a pair of joint lubricating nozzles 332 and 333 may be directed toward an upper portion and a lower portion of joint 324 to spray or otherwise apply lubricant to the joint 324 when it is in its most opened position as the trolley travels through the arcuate section of track. One set of nozzles 332 and 333 may be directed toward one of the joints of trolley 314, while a second set is directed toward the other joint 324, as shown in FIG. 7. The nozzles 332 and 333 are connected to the dispensing means of conveyor lubricator 300 via one or more hoses 334. The hoses 334 may be a single fluid conveying hose or may be a coaxial hose for conveying fluid and pressurized air, as discussed above, without affecting the scope of the present invention. Additionally, conveyor lubricator 300 may provide lubricant to rollers 316 via one or more dispensing nozzles 366 and hoses 364, and may further provide lubricant to lateral roller 317 via a dispensing nozzle 386 and hose 388.

The dispensing nozzles 332, 333, 366, and 386 may be mounted to a mounting bracket 390 which may further be connected to conveyor lubricator 300 via mounting arms 390a and 390b, such that the nozzles and hoses remain substantially fixed immediately above and along the opening 394 in the enclosed track 320. Accordingly, lubricator 300 may apply lubricant to the joints 324 of the chain 322, as the chain bends and opens while it travels through an arcuate transitional section of track. As discussed above, this provides optimal lubrication of the joints of the chain, since the fluid may more easily penetrate and better coat the pins or bolts or the like which connect the chain links together. Conveyor lubricator may further include a proximity sensor (not shown) for detecting when the trolleys 314 are in the appropriate location for the dispensing nozzles to apply the lubricant to their appropriate locations as the trolleys move along the enclosed track 320 and past the dispensing nozzles.

Therefore, the present invention provides an improved lubrication device for optimally lubricating the chain of a material handling system. The lubricating device may be implemented on I-beam type conveyors, enclosed track conveyors or other conveyor systems where a chain drives one or more trolleys along a track member. The lubricating device may be mounted along a horizontal section of track adjacent to an arcuate section, or along the arcuate section, in order to facilitate lubrication as the chain curves along the curvilinear transitional section. In enclosed track applications, the lubricator may be mounted on an upper wall or either side wall of the track. Preferably, the lubricating device is positioned along an arcuate transitional section between horizontal sections of differing heights.

Mounting the conveyor lubricating device adjacent to or along the arcuate section results in a substantial advantage over the traditional methods for lubricating chains. This is due to the fact that as the chain and trolley follow the downward curvature of the track, the chain links pivot about their link pins or bolts, which opens the joints of the chain to allow lubricant to penetrate fully therein. As noted above, this is a substantial improvement for bolted chains, since the bolts securing the joints of the chain rotate within the joints. The lubricant thus may substantially cover the entire bolt surface, thereby improving performance and extending the life of the chain.

While the present invention is primarily directed toward providing optimal lubrication of bolted chains, mounting the conveyor lubricating device in such a manner clearly provides significantly improved lubrication for X-chains or I-pin chains, even though the pins in these chains do not rotate within the joint. The bending of the chain joints as they extend downward again opens up the joint for more fluid to penetrate therein, thereby providing improved lubrication of the joint and the corresponding pin, in a similar fashion as the bolted chains noted above.

Because the conveyor lubricator of the present invention is mounted adjacent to the curve in the transition section of the track, it may not be placed in an optimal location for checking and filling the fluid levels in the reservoir. Therefore, an additional aspect of the present invention is to provide a fluid reservoir on the ground or at an otherwise convenient location adjacent to or near the corresponding conveyor lubricator. A pump may then be implemented to communicate the lubricant to the conveyor lubricator. In order to communicate the fluid to the lubricator, a minimal amount of power is required from the pump, such that any cost effect on the material handling system and lubrication system is kept at a minimum, while still providing an optimal lubrication system which is substantially easier to inspect and maintain.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A chain lubricating device for lubricating a chain in a conveyor system having a conveyor track and a plurality of trolleys movable along the track, the trolleys being interconnected by a drive chain, the conveyor track having multiple horizontal sections, at least two of which are at dissimilar heights and interconnected by arcuate transition sections to accommodate movement of the trolleys from one height to the other, said lubricating device comprising:

a reservoir of lubricating fluid;

a metering device which meters the flow of lubricating fluid; and at least one applicating device interconnected to said metering device, said metering device being positionable adjacent to an arcuate section, said applicating device being located alongside one of said adjacent arcuate sections whereby the drive chain is lubricated while transitioning through the arcuate section.

2. The chain lubricating device of claim 1, wherein the track is an I-beam conveyor track, said metering device being mountable to an upper surface of the track.

3. The chain lubricating device of claim 1, wherein the track is an enclosed track comprising an upper wall and a pair of side walls, said metering device being mountable to at least one of the upper wall and one of the side walls.

4. The chain lubricating device of claim 1, wherein said at least one applicating device comprises at least one dispensing nozzle directable to at least one joint of the drive chain as the drive chain moves along the arcuate section.

5. The chain lubricating device of claim 4, wherein said at least one applicating device further comprises at least one roller lubricator for dispensing lubricant to an axle of a trolley roller which rolls along the track.

6. The chain lubricating device of claim 1, wherein said at least one applicating device is interconnected to said metering device via a co-axial hose, said metering device being further interconnected to a pressurized air source, said metering device communicating lubricating fluid and pressurized air to said at least one applicating device.

7. The chain lubricating device of claim 1 further including a pump, said reservoir being positioned remotely from said metering device, said pump being operable to communicate the lubricating fluid from said reservoir to said metering device.

8. The chain lubricating device of claim 1, wherein said metering device is mounted to one of the horizontal sections of track.

9. The chain lubricating device of claim 8, wherein said metering device is mounted to at least one of an upper surface and a side wall of the horizontal section of track.

10. The chain lubricating device of claim 1, wherein said metering device is mounted along the arcuate section.

11. The chain lubricating device of claim 10, wherein said metering device is mountable to an upper surface of the track via a pair of mounting extensions of differing lengths, such that said lubricating device is generally level along the arcuate section of track.

12. A lubricating device for communicating lubricating fluid to a material handling system having an elongated track along which multiple trolleys transport material, and a chain having a plurality of connecting members with joints between longitudinally consecutive connecting members, the trolleys being interconnected by the chain such that the chain drives the trolleys along the track, the track including a first horizontal section and a second horizontal section, the first horizontal section being at a height greater than the second horizontal section, the track further having an arcuate transitional section between the first and second horizontal sections such that the horizontal sections are connected by a smooth curvilinear section of track comprising an upper transitional section and a lower transitional section, said lubricating device comprising:

a reservoir for containing lubricating fluid;

at least one fluid dispenser for directing the lubricating fluid toward the chain of the material handling system; and a metering device for providing lubricating fluid to said at least one fluid dispenser, wherein said lubricating device is positionable adjacent to the arcuate transitional section such that said at least one fluid dispenser provides lubricating fluid to the joints of the chain as the chain curves along the arcuate transitional section.

13. The lubricating device of claim 12, wherein the connecting member is a pin.

14. The lubricating device of claim 12, wherein said reservoir is located remote from said metering device, said lubricating device further including a pump and a conduit to communicate the lubricating fluid from said reservoir to said metering device.

15. The lubricating device of claim 12, wherein said lubricating device is positioned along the track adjacent to at least one of the upper and lower transitional sections.

16. The lubricating device of claim 12, wherein said lubricating device is mountable adjacent to the first horizontal section, such that said at least one fluid dispenser provides lubricating fluid to the joints of the chain as the chain bends along the upper transitional section.

17. The lubricating device of claim 12, wherein said lubricating device is mountable adjacent to the second horizontal section of the track, such that said at least one fluid dispenser provides lubricating fluid to the joints of the chain as the chain bends along the lower transitional section.

18. The lubricating device of claim 12, wherein the chain of the material handling system has a plurality of connecting members which are secured together at a joint by a connecting member within the joint, such that lubricating fluid from said at least one fluid dispenser penetrates into the joint as the chain bends along the arcuate section.

19. The lubricating device of claim 12, wherein the connecting member is a bolt which is free to rotate within the joint.

20. The lubricating device of claim 12, wherein the track of the material handling system is an I-beam track and the trolley includes at least one roller that travels along said I-beam track.

21. The lubricating device of claim 20, wherein said lubricating device is mountable to an upper surface of said I-beam track along one of the first and second horizontal sections.

22. The lubricating device of claim 20, wherein said lubricating device is mounted to an upper surface of said I-beam track along one of the upper and lower transitional sections of the arcuate transitional section.

23. The lubricating device of claim 12, wherein the track of the material handling system is an enclosed track and the chain is movable within said enclosed track, the trolley including at least one roller that travels within said enclosed track.

24. The lubricating device of claim 23, wherein said lubricating device is mountable to at least one of an upper surface and a side surface of said enclosed track along one of the first and second horizontal sections.

25. The lubricating device of claim 23, wherein said lubricating device is mountable to at least one of an upper surface and a side surface of said enclosed track along one of the upper and lower transitional sections of the arcuate transitional section.

* * * * *